US012345383B2

(12) United States Patent
Lei

(10) Patent No.: US 12,345,383 B2
(45) Date of Patent: Jul. 1, 2025

(54) FASTENING TYPE WATERPROOF LED LAMP AND FASTENING TYPE WATERPROOF LIGHT STRING

(71) Applicants: Guangdong Jiaduowang Lighting Tech Co., Ltd, Dongguan (CN); Dongguan Miray E-Tech Co., Ltd, Dongguan (CN)

(72) Inventor: Ziyang Lei, Dongguan (CN)

(73) Assignees: Guangdong Jiaduowang Lighting Tech Co., Ltd, Dongguan (CN); Dongguan Miray E-Tech Co., Ltd, Dongguan (CN)

( * ) Notice: Subject to any disclaimer, the term of this patent is extended or adjusted under 35 U.S.C. 154(b) by 0 days.

(21) Appl. No.: 18/898,708

(22) Filed: Sep. 27, 2024

(65) Prior Publication Data

US 2025/0020291 A1 Jan. 16, 2025

(30) Foreign Application Priority Data

Jul. 22, 2024 (CN) ......................... 202421737367.7

(51) Int. Cl.

| | |
|---|---|
| ***F21S 4/10*** | (2016.01) |
| ***F21V 21/08*** | (2006.01) |
| ***F21V 23/06*** | (2006.01) |
| ***F21V 31/00*** | (2006.01) |
| ***F21Y 103/10*** | (2016.01) |
| ***F21Y 115/10*** | (2016.01) |

(52) U.S. Cl.
CPC ................ *F21S 4/10* (2016.01); *F21V 21/08* (2013.01); *F21V 23/06* (2013.01); *F21V 31/005* (2013.01); *F21Y 2103/10* (2016.08); *F21Y 2115/10* (2016.08)

(58) Field of Classification Search
CPC ...... F21S 4/10–22; F21V 21/08; F21V 23/06; F21V 31/005; F21Y 2103/10; F21Y 2115/10
See application file for complete search history.

(56) References Cited

U.S. PATENT DOCUMENTS

| | | | |
|---|---|---|---|
| 11,408,585 B1 * | 8/2022 | Wang | ..................... F21V 23/06 |
| 2015/0377475 A1 | 12/2015 | Ji | |
| 2017/0051911 A1 | 2/2017 | Xie | |
| 2024/0142066 A1 | 5/2024 | Li et al. | |

* cited by examiner

*Primary Examiner* — Jason M Han
(74) *Attorney, Agent, or Firm* — Hemisphere Law, PLLC; Zhigang Ma

(57) ABSTRACT

The present disclosure relates to the technical field of lamps, and discloses a fastening type waterproof light-emitting diode (LED) lamp and a fastening type waterproof light string. The lamp includes a housing, and further includes a sealing plug, a waterproof plugging base, and a light-emitting assembly; the sealing plug is assembled on an inner side of an opening part of the housing and is at least provided with two wire guide holes; one end of the waterproof plugging base is configured to seal an outer side of the opening part of the housing; and a clamping tongue is arranged at the other end.

10 Claims, 9 Drawing Sheets

FASTENING TYPE WATERPROOF LED LAMP AND FASTENING TYPE WATERPROOF LIGHT STRING

TECHNICAL FIELD

The present disclosure relates to the technical field of lamps, and in particular, to a fastening type waterproof light-emitting diode (LED) lamp and a fastening type waterproof light string.

BACKGROUND

In a traditional outdoor decorative light string, connection between a light string cable and a lamp is mainly achieved by embedding a metal copper sleeve in a plastic lamp base, and the lamp is in threaded connection with a metal threaded lamp holder of a bulb to achieve mounting of the lamp. However, in this connection mode, many metal materials need to be used, causing high molding cost for the bulb. For example, the cost of a single copper sleeve in the existing lamp base is about 0.3 yuan, and the cost of the metal threaded lamp holder of the bulb is about 0.2 yuan. Meanwhile, a large amount of plastic needs to be wrapped around the copper sleeve, which further increases the cost. The existing structure uses excessive metal materials, so that the production cost of a single bulb is too high at present. In view of this, the inventor has made an invention.

SUMMARY

To overcome the shortcomings in the prior art, the present disclosure aims to provide a fastening type waterproof LED lamp and a fastening type waterproof light string, which have the characteristic of low cost.

To achieve the above objectives, the present disclosure provides a fastening type waterproof LED lamp, including a housing, and further including a sealing plug, a waterproof plugging base, and a light-emitting assembly; the sealing plug is assembled on an inner side of an opening part of the housing and is at least provided with two wire guide holes; one end of the waterproof plugging base is configured to seal an outer side of the opening part of the housing; a clamping tongue is arranged at the other end; the light-emitting assembly is arranged in the housing; the light-emitting assembly at least includes a first metal wire, a light-emitting lamp body, and a second metal wire which are electrically connected to each other in sequence; the other end of the first metal wire and the other end of the second metal wire are electrically connected to the waterproof plugging base respectively through the wire guide holes; the waterproof plugging base is provided with a first conductive plugging column and a second conductive plugging column; the fastening type waterproof LED lamp further includes a wiring seat and a fixed seat electrically connected to the wiring seat; a plugging slot is provided in the fixed seat; a fastening position is provided in the plugging slot; the waterproof plugging base is plugged into the plugging slot, and the clamping tongue is clamped into the fastening position; and hole positions adapted to the conductive plugging columns are further provided in the plugging slot.

Preferably, the fastening type waterproof LED lamp further includes a first power-on wire; and the wiring seat is electrically connected to the fixed seat through the first power-on wire.

Preferably, the first metal wire and the second metal wire extend out of a surface of the waterproof plugging base through the wire guide holes; and each of the first conductive plugging column and the second conductive plugging column is a part of each metal wire.

Preferably, each of the first metal wire and the second metal wire includes a conductive wire and a conductive column; a diameter of the conductive column is greater than a diameter of the conductive wire; and the first conductive plugging column and the second conductive plugging column are arranged at tail ends of the conductive columns.

Preferably, the waterproof plugging base further includes a second power-on wire; one end of the second power-on wire is electrically connected to the waterproof plugging base; and the other end is electrically connected to the light-emitting assembly.

Preferably, the waterproof plugging base is further provided with an isolation wall; and the fixed seat is provided with an isolation slot matched with the isolation wall.

Preferably, the light-emitting body is an LED light bar or an LED light bead.

The present disclosure further includes a fastening type waterproof light string, including the above lamp, and further includes a main power cable, a male plug, and a female socket; the male plug and the female socket are respectively arranged at two ends of the main power cable; and the wiring seat is arranged in a middle part of the main power cable and is electrically connected to the main power cable.

Preferably, the wiring seat is provided with a hanging lug convenient for hanging the lamp.

Preferably, the fastening type waterproof light string further includes a hook; an elastic clamping portion is arranged at one end of the hook; and the elastic clamping portion is clamped into the hanging lug.

Beneficial effects: Compared with the prior art, the present disclosure discloses a fastening type waterproof LED lamp and a fastening type waterproof light string. The present disclosure has the following advantages: 1. The light string and the lamp have simple structures. Without a metal lamp holder and a metal copper sleeve, the production cost is significantly reduced, and the existing production needs are met. 2. A waterproof rubber plug is assembled at the opening part of the housing, and the opening part of the housing is further injection-molded for sealing, which can thoroughly seal the housing, and the formed lamp has greatly improved waterproof performance and can thoroughly isolate external moisture from entering the lamp. 3. A light string cable and the lamp are fastened and assembled using fasteners, so that the assembling is convenient, and the assembling efficiency is high.

REFERENCE NUMERALS INCLUDE

Figure 1:
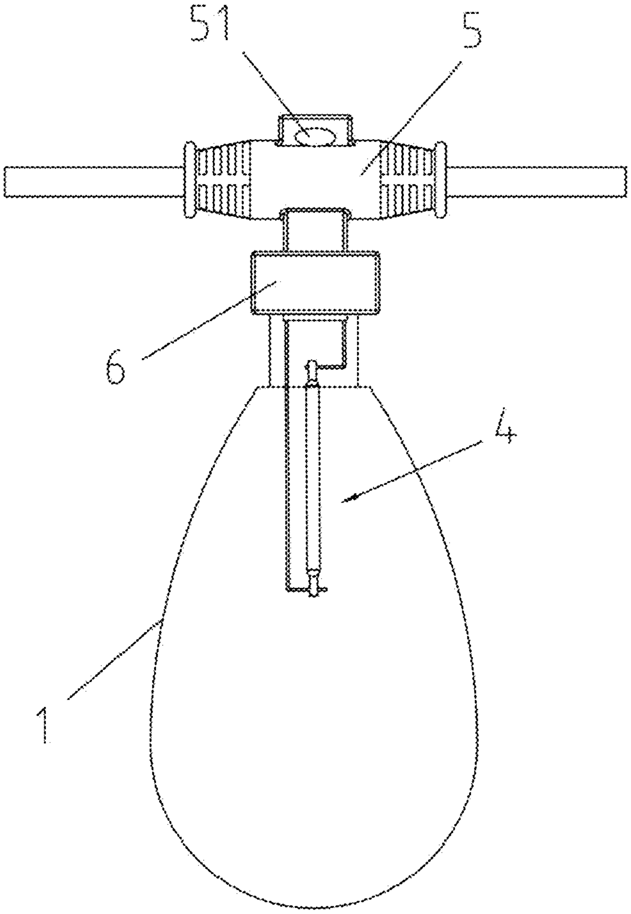
FIG. 1 is a schematic diagram of an entire structure of a lamp according to the present disclosure.

1: housing; 2: sealing plug; 21: wire guide hole; 3: waterproof plugging base; 31: clamping tongue; 32: first conductive plugging column; 33: second conductive plugging column; 34: isolation wall; 4: light-emitting assembly; 41: first metal wire; 411: conductive wire; 412: conductive column; 42: light-emitting lamp body; 43: second metal wire; 5: wiring seat; 51: hanging lug; 6: fixed seat; 61: plugging slot; 62: fastening position; 63: hole position; 64: isolation slot; 7: first power-on wire; 8: second power-on wire; 81: first positive wire; 82: first negative wire; 9: main power cable; 91: male plug; 92: female socket; 10: hook; 101: elastic clamping portion; and 11: resistor.

DETAILED DESCRIPTION OF THE EMBODIMENTS

The present disclosure will be explained below in conjunction with the accompanying drawings 1 to 9.

The present disclosure provides a fastening type waterproof LED lamp, including a housing 1, and further including a sealing plug 2, a waterproof plugging base 3, and a light-emitting assembly 4. The sealing plug 2 is assembled on an inner side of an opening part of the housing 1 and is at least provided with two wire guide holes 21; one end of the waterproof plugging base 3 is configured to seal an outer side of the opening part of the housing 1; a clamping tongue 31 is arranged at the other end; the light-emitting assembly 4 is arranged in the housing 1; the light-emitting assembly 4 at least includes a first metal wire 41, a light-emitting lamp body 42, and a second metal wire 43 which are electrically connected to each other in sequence; the other end of the first metal wire 41 and the other end of the second metal wire 43 are electrically connected to the waterproof plugging base 3 respectively through the wire guide holes 21; and the waterproof plugging base 3 is provided with a first conductive plugging column 32 and a second conductive plugging column 33. The fastening type waterproof LED lamp further includes a wiring seat 5 and a fixed seat 6; the fixed seat 6 is arranged in the wiring seat 5; a plugging slot 61 is provided in the fixed seat 6; a fastening position 62 is provided in the plugging slot 61; the waterproof plugging base 3 is plugged into the plugging slot 61, and the clamping tongue 31 is clamped into the fastening position 62; and hole positions 63 adapted to the conductive plugging columns are further provided in the plugging slot 61. The conductive plugging columns are plugged into the hole positions 63 to achieve electric connection of the lamp.

The present disclosure improves the connection mode for the lamp and the power cable. The mode for electrically connecting a metal threaded lamp holder to a metal copper sleeve of the traditional lamp is improved as fastening assembling between the lamp and the power cable. A metal pin is used inside to be electrically connected to the hole positions 63. This assembling mode saves a large number of metal raw materials and greatly reduces the manufacturing cost of the light string. The original metal material cost of about 0.6 yuan is reduce to about 0.06 yuan after the improvement, so that the cost is reduced by nearly ten times. Meanwhile, a lamp base with a large volume does not need to be coated and formed, so that the cost for plastic materials is also reduced. Secondly, in this technical solution, the sealing plug 2 improves the waterproof performance of a bulb, and the waterproof plugging base 3 is formed on the outer side of the opening part of the lampshade 1 again through injection molding, so that secondary waterproofing of the lamp is achieved. After the waterproof plugging base 3 is formed, the opening part of the housing 1 is thoroughly sealed, to achieve absolute sealing of the lamp. On the other hand, after the lamp and the wiring seat 5 are assembled in a fastened manner, so that the assembling is firm, convenient, and efficient. Furthermore, the lamp is removable and replaceable, so that the flexibility of the light string is higher.

Figure 2:
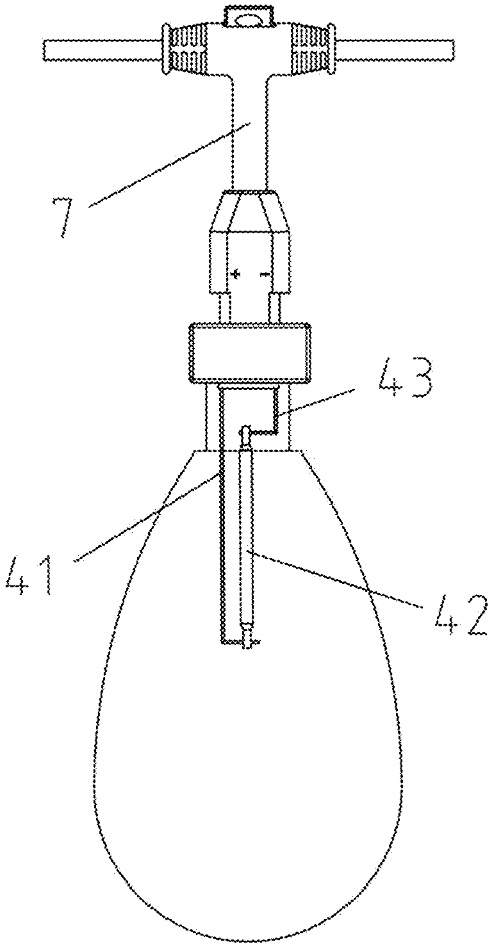
FIG. 2 is a schematic structural diagram of another embodiment of a lamp according to the present disclosure.

In another embodiment, as shown in FIG. 2, the fastening type waterproof LED lamp further includes a first power-on wire 7; and the wiring seat 5 is electrically connected to the fixed seat 6 through the first power-on wire 7. This embodiment can present pendant decoration of the lamp. The decorative effect is better when the light string is hung outdoors.

When the plugging base does not include a second power-on wire 8, the first metal wire 41 and the second metal wire 43 directly extend out of a surface of the waterproof plugging base 3 through the wire guide holes 21 form the first conductive plugging column 32 with strength and the second conductive plugging column 33 with strength. At this time, each of the first conductive plugging column 32 and the second conductive plugging column 33 is a part of each metal wire.

Figure 6:
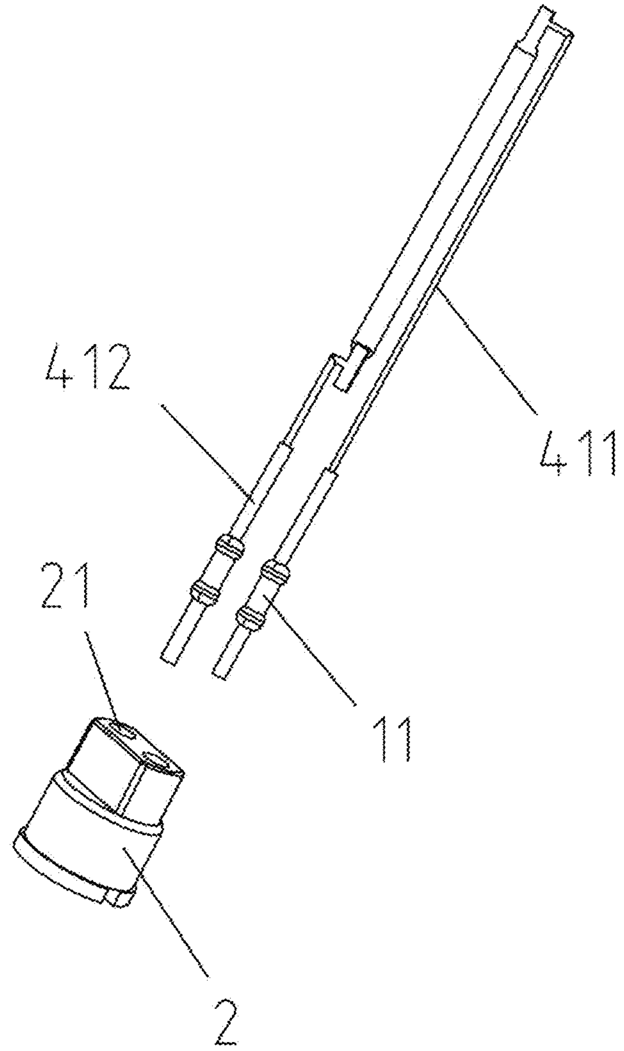
FIG. 6 is a schematic structural diagram of a light-emitting assembly according to the present disclosure.
Figure 7:
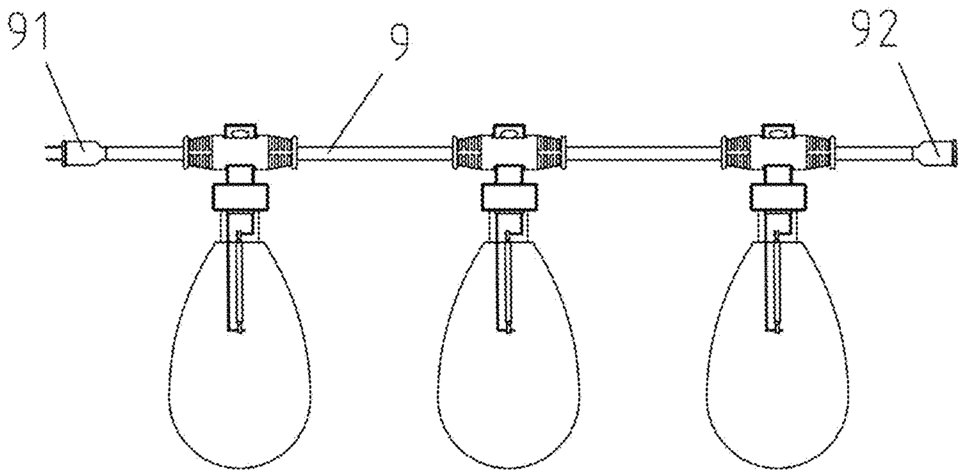
FIG. 7 is a schematic structural diagram of a waterproof light string of the present disclosure.

In the above embodiment, as shown in FIG. 6, each of the first metal wire 41 and the second metal wire 43 is composed of two parts: a conductive wire 411 and a conductive column 412. A diameter of the conductive column 412 is greater than that of the conductive wire 411. At this time, the first conductive plugging column 32 and the second conductive plugging column 33 are arranged at the tail ends of the conductive column 412. This structure can ensure that the first metal wire 41 and the second metal wire 43 have sufficient strength to be plugged into the fixed seat 6, further save raw materials for the metal wires, and further reduce the manufacturing cost. As shown in FIG. 6, the first metal wire and the second metal wire are further provided with heat dissipation resistors 11.

Figure 3:
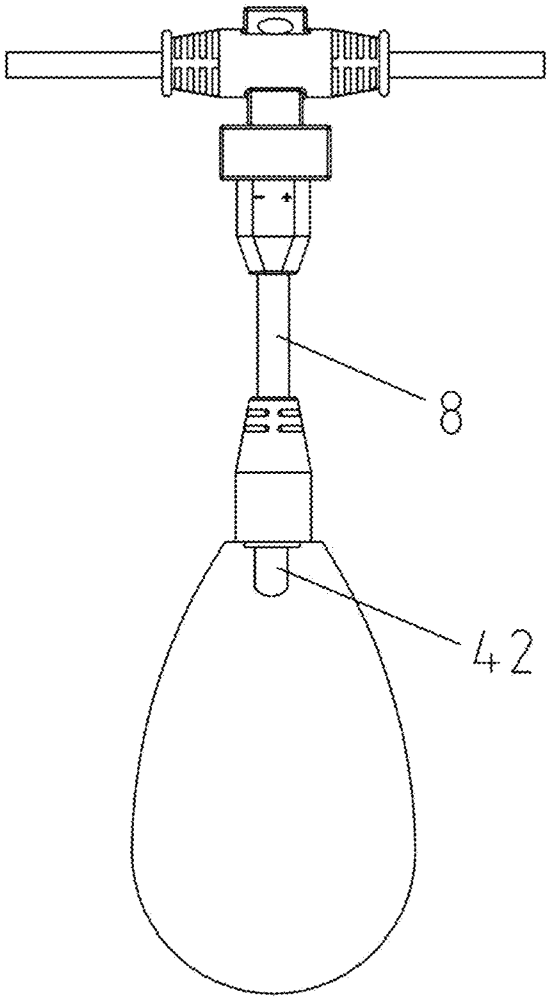
FIG. 3 is a schematic structural diagram of still another embodiment of a lamp according to the present disclosure.
Figure 4:
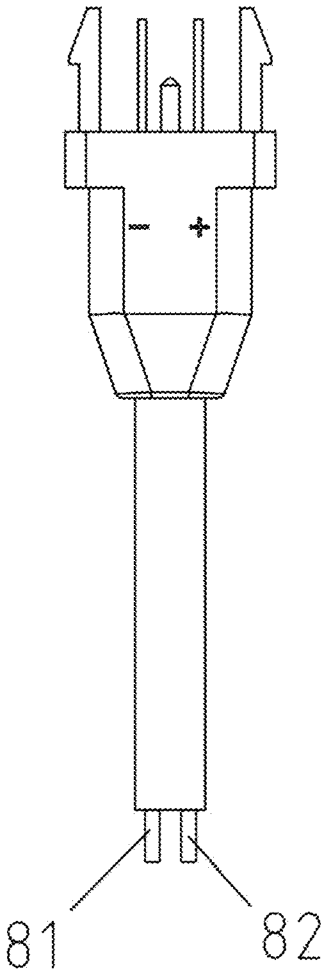
FIG. 4 is a schematic structural diagram of a second power-on wire according to the present disclosure.
Figure 5:
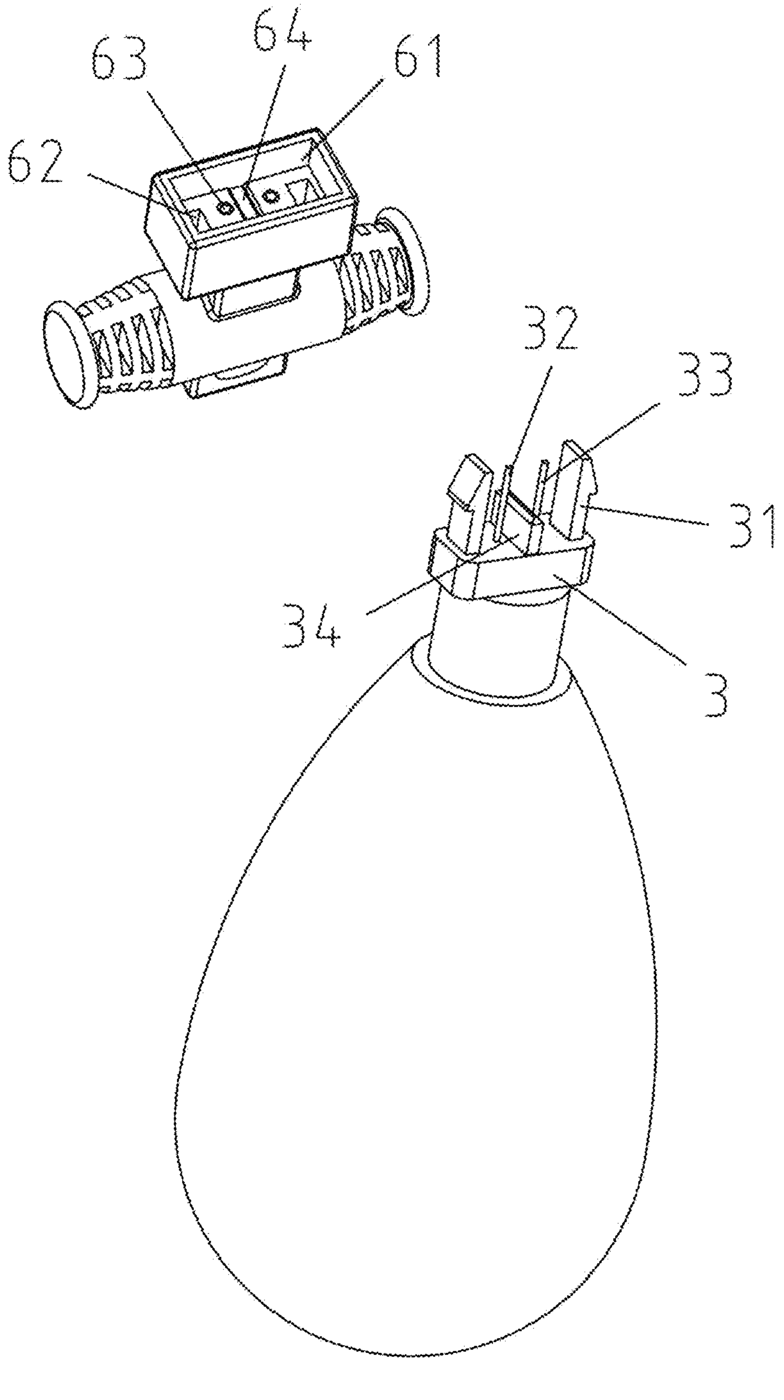
FIG. 5 is a schematic structural diagram of a waterproof plugging base and a wiring seat according to the present disclosure.

As shown in FIG. 3, in yet another embodiment, the waterproof plugging base 3 further includes a second power-on wire 8; one end of the second power-on wire 8 is electrically connected to the waterproof plugging base 3; and the other end is electrically connected to the light-emitting assembly 4. This structure can achieve the pendant effect of the lamp too and improve the decorativeness of the lamp.

As a preference, a first positive wire 81 and a first negative wire 82 are arranged in the second power-on wire 8; the first positive wire 81 is connected to the first metal wire 41 through butt welding; and the first negative wire 82 is connected to the second metal wire 43 through butt welding; and the opening part of the housing 1 is sealed by injection molding. Similarly, the electric connection between the wiring seat 5 and the main power cable 9 is achieved by butt welding too. The butt welding here means that an electrode wire is directly heated to be welded with the other electrode wire after being dipped with tin, without wrapping by a copper terminal. Compared with a traditional method for achieving electric connection by wrapping a copper terminal around a light string or electrode wires of a lamp, electrically connecting the electrode wires in the butt welding manner can further ensure that the electrode wires are firmly electrically connected to the lamp either during secondary injection molding or during outdoor use at ordinary times, and poor contact of the lamp can be effectively prevented. In addition, the cost is lower.

In this technical solution, an isolation wall 34 is further arranged on a surface of the waterproof plugging base 3; and the fixed seat 6 is provided with an isolation slot 64 matched with the isolation wall 34. When the waterproof plugging base 3 is plugged into the fixed seat 6, the isolation wall 34 and the isolation slot 64 can be used to assist in precise positioning and mounting, to improve the assembling efficiency. In addition, the isolation wall 34 isolates a positive conductive plugging column from a negative conductive plugging column, to prevent a short circuit in the lamp due to accidental contact between electrodes. In this technical solution, the isolation wall 34 is asymmetrically arranged on the waterproof plugging base 3, namely, distances between the isolation wall 34 and two ends of the waterproof plugging base 3 are different, so that the isolation wall 34 can further prevent the electrodes of the lamp from being mistakenly plugged and improve the safety.

As shown in FIG. 1 and FIG. 3, the light-emitting lamp body 42 of this technical solution can be an LED light bar or an LED light bead. During production, a light-emitting element can be randomly selected according to a use requirement. The LED light bead can be a controllable seven-color light bead.

The present disclosure further includes a fastening type waterproof light string, including the above lamp, and further including a main power cable 9, a male plug 91, and a female socket 92. The male plug 91 and the female socket 92 are respectively arranged at two ends of the main power cable 9; and the wiring seat 5 is arranged in a middle part of the main power cable 9 and is electrically connected to the main power cable 9. The light string of the present disclosure is mainly used in outdoor parties and has all the advantages of low cost, high waterproof performance, simple structure, fast assembling, and the like of the above-mentioned lamp.

As a preference, the wiring seat 5 is provided with a hanging lug 51 convenient for hanging the light string outdoors.

Figure 8:
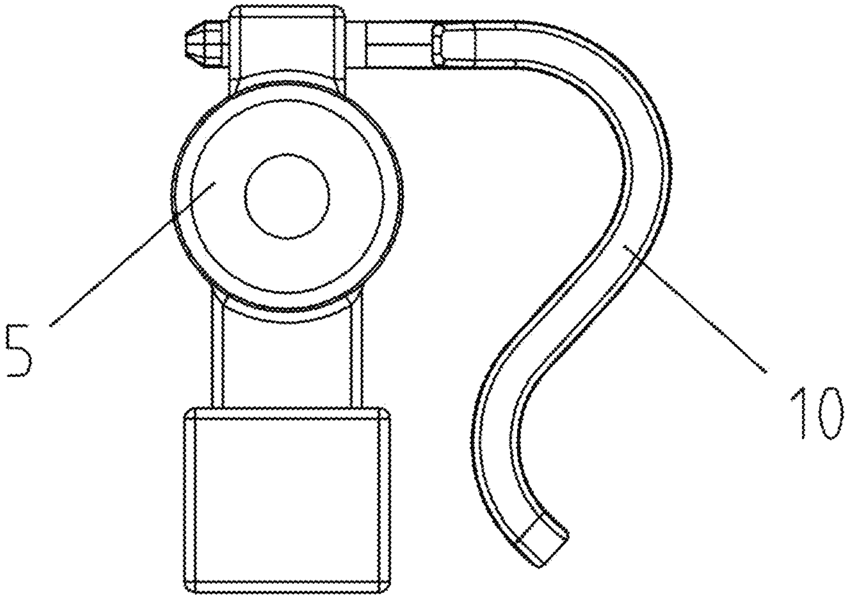
FIG. 8 is a schematic structural diagram of a second embodiment of a hanging lug according to the present disclosure.
Figure 9:
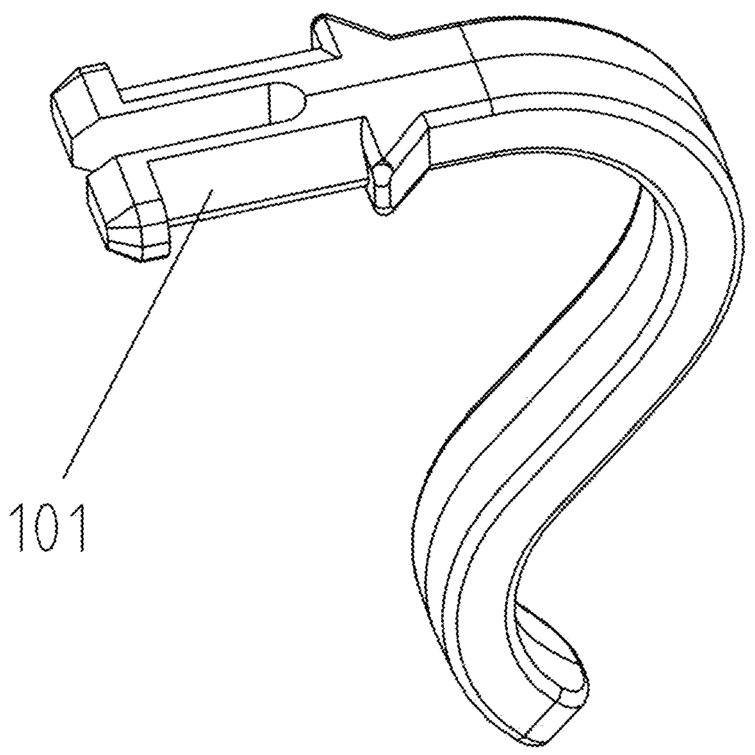
FIG. 9 is a schematic structural diagram of a hook according to the present disclosure.

To enlarge the range of application of the light string, the light string further includes a hook 10. An elastic clamping portion 101 is arranged at one end of the hook 10. During use, the elastic clamping portion 101 can be clamped into the hanging lug 51, to form a light string hanging structure as shown in FIG. 8. After the hanging lug 51 is used in conjunction with the hook 10, another form of hanging structure is achieved, so that the light string can be suitable for being used in more outdoor scenes has a wider range of application.

The above content only describes preferred embodiments of the present disclosure. A person of ordinary skill in the art can make changes to specific implementations and the application scope according to the idea of the present disclosure. The content of this specification should not be understood as a limitation on the present disclosure.

What is claimed is:

1. A fastening type waterproof light-emitting diode (LED) lamp, comprising a housing (1), and further comprising a sealing plug (2), a waterproof plugging base (3), and a light-emitting assembly (4), wherein the sealing plug (2) is assembled on an inner side of an opening part of the housing (1) and is at least provided with two wire guide holes (21); one end of the waterproof plugging base (3) is configured to seal an outer side of the opening part of the housing (1); a clamping tongue (31) is arranged at the other end; the light-emitting assembly (4) is arranged in the housing (1); the light-emitting assembly (4) at least comprises a first metal wire (41), a light-emitting lamp body (42), and a second metal wire (43) which are electrically connected to each other in sequence; the other end of the first metal wire (41) and the other end of the second metal wire (43) are electrically connected to the waterproof plugging base (3) respectively through the wire guide holes (21); the waterproof plugging base (3) is provided with a first conductive plugging column (32) and a second conductive plugging column (33);

the fastening type waterproof LED lamp further comprises a wiring seat (5) and a fixed seat (6) electrically connected to the wiring seat (5); a plugging slot (61) is provided in the fixed seat (6); a fastening position (62) is provided in the plugging slot (61); the waterproof plugging base (3) is plugged into the plugging slot (61), and the clamping tongue (31) is clamped into the fastening position (62); and hole positions (63) adapted to the conductive plugging columns (32, 33) are further provided in the plugging slot (61).

2. The fastening type waterproof LED lamp according to claim 1, further comprising a first power-on wire (7); and the wiring seat (5) is electrically connected to the fixed seat (6) through the first power-on wire (7).

3. The fastening type waterproof LED lamp according to claim 1, wherein the first metal wire (41) and the second metal wire (43) extend out of a surface of the waterproof plugging base (3) through the wire guide holes (21); and each of the first conductive plugging column (32) and the second conductive plugging column (33) is a part of each metal wire.

4. The fastening type waterproof LED lamp according to claim 3, wherein each of the first metal wire (41) and the second metal wire (43) comprises a conductive wire (411) and a conductive column (412); a diameter of the conductive column (412) is greater than a diameter of the conductive wire (411); and the first conductive plugging column (32) and the second conductive plugging column (33) are arranged at tail ends of the conductive columns (412).

5. The fastening type waterproof LED lamp according to claim 1, wherein the waterproof plugging base (3) further comprises a second power-on wire (8); one end of the second power-on wire (8) is electrically connected to the waterproof plugging base (3); and the other end is electrically connected to the light-emitting assembly (4).

6. The fastening type waterproof LED lamp according to claim 1, wherein the waterproof plugging base (3) is further provided with an isolation wall (34); and the fixed seat (6) is provided with an isolation slot (64) matched with the isolation wall (34).

7. The fastening type waterproof LED lamp according to claim 1, wherein the light-emitting lamp body (42) is an LED light bar or an LED light bead.

8. A fastening type waterproof light string, comprising a plurality of lamps according to claim 1, further comprising a main power cable (9), a male plug (91), and a female socket (92), wherein the male plug (91) and the female socket (92) are respectively arranged at two ends of the main power cable (9); and the wiring seat (5) is arranged in a middle part of the main power cable (9) and is electrically connected to the main power cable (9).

9. The fastening type waterproof light string according to claim 8, wherein the wiring seat (5) is provided with a hanging lug (51) convenient for hanging the lamp.

10. The fastening type waterproof light string according to claim 9, further comprising a hook (10), wherein an elastic clamping portion (101) is arranged at one end of the hook (10); and the elastic clamping portion (101) is clamped into the hanging lug (51).

* * * * *